June 17, 1947.                G. VAN DAAM                2,422,450
                    COMBINED SPACE HEATER AND GRILL
                         Filed Sept. 8, 1945
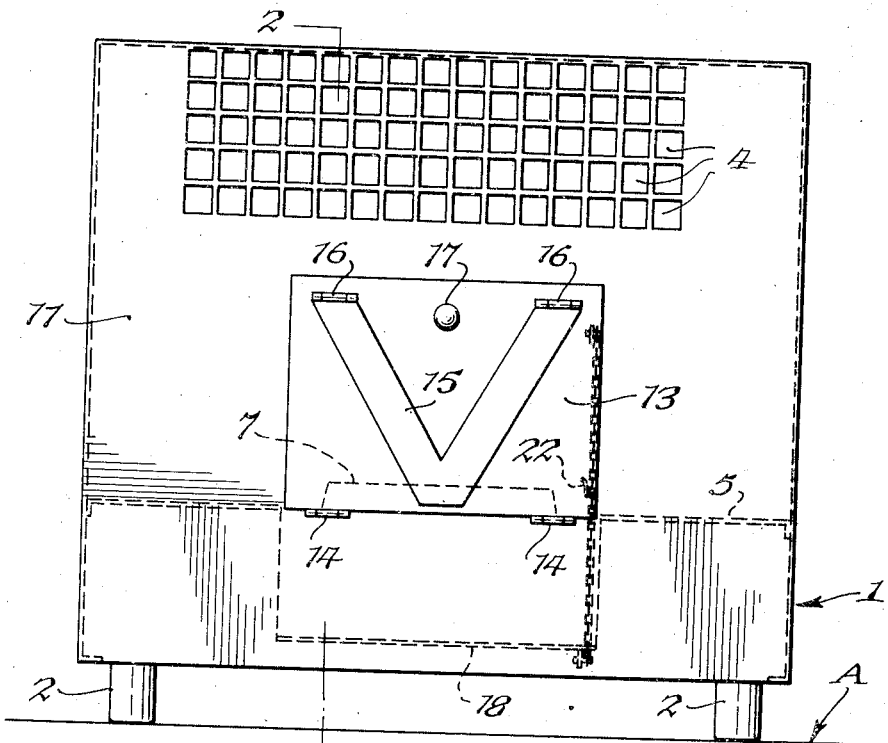
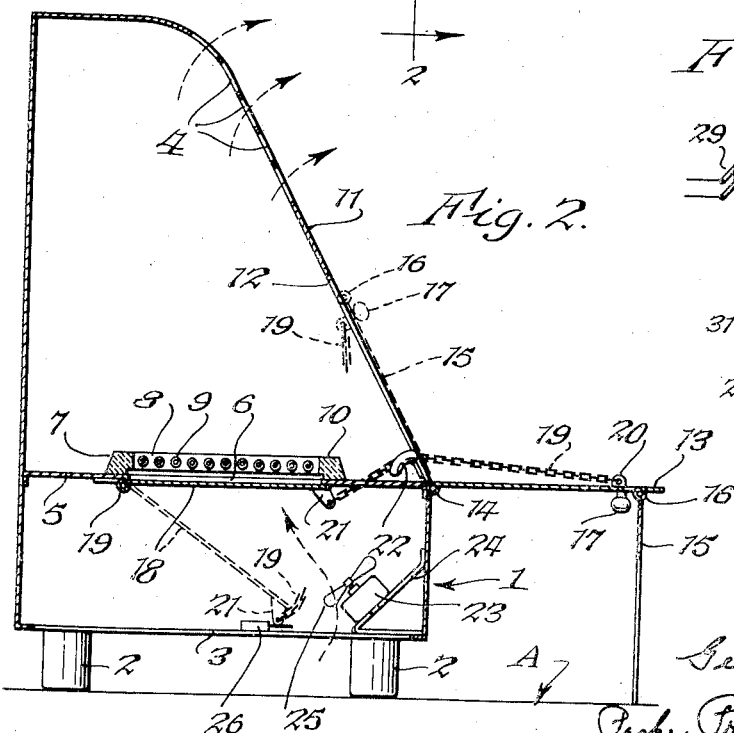
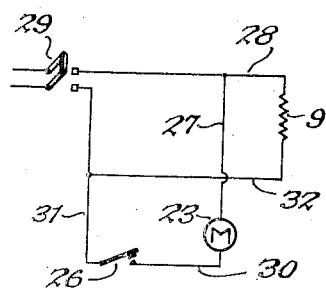
Fig. 1.
Fig. 2.
Fig. 3.
INVENTOR
Gerrit Van Daam
BY Parker, Prochnow & Farmer
ATTORNEYS Patented June 17, 1947

2,422,450

UNITED STATES PATENT OFFICE 2,422,450

COMBINED SPACE HEATER AND GRILL

Gerrit Van Daam, Buffalo, N. Y.

Application September 8, 1945, Serial No. 615,194

10 Claims. (Cl. 219—38)

This invention relates to electric heaters and is in the nature of an improvement upon the subject matter of my prior Patent No. 2,313,786 granted March 16, 1943. In said prior patent, is disclosed a housing having therein a heating unit with spaced stretches of a heating element between which stretches air may pass upwardly from an air inlet in the bottom of the housing to an air outlet in the upper part of the casing. This type of heater may be called a space heater in that the air passing through the housing has a thermosiphon circulation and carries heat received from said heating element into the room in which the housing is placed. In small apartments where such space heaters are particularly useful, it is desirable to utilize such heaters as completely as possible, and this invention relates to a space heater which may be also used as a grill, thereby increasing the usefulness of the heating element with resultant saving of space occupied by equipment in the apartment, and of the cost of a separate grill.

An object of the invention is to provide an improved electric heater which may be selectively used either as a space heater or as a grill for preparing food; which will be efficient as both a space heater and as a grill; which will not occupy more space than that occupied by an ordinary space heater; and which will be relatively simple, efficient, compact and inexpensive.

Another object of the invention is to provide an improved electric heater in which the heating element may be utilized either for heating the air in an apartment, or for cooking; which may be converted from a space heater to a grill and vice versa, by a simple manipulation; and with which the efficiency of the heating element, when the device is used as a grill, may be increased.

Other objects and advantages will be apparent from the following description of one embodiment of the invention, and the novel features will be particularly pointed out hereinafter in connection with the appended claims.

In the accompanying drawing:

Fig. 1 is a front elevation of one example of an electric heater constructed in accordance with this invention, with the movable parts in the positions occupied when the heater is used as a space heater;

Fig. 2 is a transverse, sectional elevation through the same, but with the movable parts shown in the positions occupied when the device is used as a grill; and Fig. 3 is a circuit diagram for the same.

In the illustrated embodiment of the invention, a housing 1 is supported on suitable legs 2 to enable circulation of air beneath the housing, and the bottom wall of the housing is provided with an air inlet opening 3. The upper part of the housing is provided with a plurality of openings or louvers 4. Intermediate of the top and bottom, the chamber of the housing is provided with a transverse partition wall 5 which has an apertured zone 6 in its interior area, and while this apertured zone may be formed of a plurality of apertures, it is preferably formed of one large aperture, as shown. Supported upon the partition wall 5 is a frame 7 which is peripherally continuous and completely surrounds this aperture 6. This frame 7 is preferably formed of electrical insulating material which will withstand heat, such as a suitable ceramic material, with a large opening 8 in face to face alignment with the opening 6. Disposed in the opening 8 are a plurality of spaced stretches 9 of an electric heater element of the resistance type, and this heater element and the supporting frame 7 constitute what may be conveniently termed an electric heating unit. The spaces between adjacent stretches 9 are open for the free movement of air therethrough.

The stretches 9 of the heating element are disposed slightly below the upper surface 10 of the frame 7, so that a cooking utensil or receptacle may be supported on the upper face of the frame 7 and out of contact with the stretches 9 of the heater element. Suitable electric circuit connections, not shown, are provided for supplying current to the heater element formed of the stretches 9, and, when the current is supplied to the heater element, the air surrounding the heater element will be heated, causing it to rise due to its decreased density, and then leave the housing through the openings 4. Since the rising air causes cold air to enter the housing through the opening 3 in the bottom, this provides what is known as a thermosiphon air circulation, similar to a hot air heating system or space heater. The wall 5 around the frame 7 is substantially imperforate, and consequently substantially all of the air passing through the housing will pass upwardly between the stretches 9 where it is heated to a temperature which effectively sterilizes the air. This heated and sterile air is circulated into the room where it mixes with and heats the other air of the room.

The housing preferably has a portion of one side wall above the partition 5 slightly inclined, as at 11, and this inclined wall portion is provided with an opennig 12 extending upwardly from about the partition wall and which may be closed by a door 13 mounted in any suitable manner for movement into and out of closed position. In this example of the invention the door is hinged to the housing by suitable hinges 14. The hinges 14 are preferably disposed at about the level of the partition wall 5, so that when the door 13 is approximately horizontal and open, it will serve as a working shelf or continuation of the wall 5. When the door is swung upwardly into the position shown in Fig. 1, it closes the opening 12. A prop member 15 is connected by suitable hinges 16 to the outer face of the door 13, adjacent the free edge thereof, so that when the door is swung upwardly into the closed position across opening 12, as shown in Fig. 1, the prop 15 will hang by gravity against the outer inclined face of the door, as shown by the dash lines in Fig. 2 and by the full lines in Fig. 1.

When the door 13 is opened and swung into a horizontal position, as shown in Fig. 2, the prop 15 will swing by gravity into a vertical position where it engages with the supporting surface A and forms a support for the free edge of the door. The length of the prop 15 is such that when its free edge rests upon the supporting surface A, the prop will hold the door 13 in a horizontal position, as shown by full lines in Fig. 2. While the prop 15 may be of any suitable shape, I have found that it may advantageously be made of V-shape, as shown in Fig. 1, with the upper or free ends of the arms of the V carrying the hinges, and with the base of the V resting upon the supporting surface A. The door 13 preferably has a distance from the hinges 14 to the hinges 16 equal to or greater than the length of the prop 15 when depending from the door, so that when the door is closed, the prop 15 will, for its entire length from the hinge 16, lie flat against the door. A suitable handle or knob 17 may be provided on the door adjacent its free edge by which it may be opened and closed.

The opening 12 has a width and heighth adequate to freely pass an ordinary household cooking utensil, so that when the door is opened, as shown in Fig. 2, direct access will be provided to the chamber of the housing above the partition wall 5, so that one may place a cooking utensil or food to be cooked upon the upper face 10 of the frame 7, where it can be heated by heat radiated from the stretches 9 of the heater element. While the heating unit is being used as a heating stove or grill for cooking purposes, if the cooking utensil completely bridges the opening 8 in the frame 7, this would prevent substantial movement of air upwardly past the heating element and thus prevent dissipation of heat by air passing between the stretches 9, but sometimes the cooking utensil may not fully prevent such movement of air, and therefore I preferably also provide a device for obstructing movement of air through spaces between the stretches 9 of the heater element while the device is being used as a grill. For this purpose a substantially imperforate baffle member or plate 18 is connected at one of its edges, by suitable hinges 19 to the underface of the partition wall 5, so that when it is swung upwardly against the underface of the partition wall 5, it completely bridges and closes the aperture 6.

When the plate 18 is released, it swings by gravity into the inclined position shown by the dash lines in Fig. 2. Since this plate 18 is usually employed to obstruct the air only while the door 13 is in open position, I preferably provide a suitable connection between the door and this swinging baffle plate or member 18, so that when the door is opened, the plate 18 will be automatically moved into the full line position shown in Fig. 2, and when the door is closed, the plate 18 will be released so as to swing by gravity into the dash line position in Fig. 2 where it allows air to pass upwardly through the heater unit. A simple form of connection for this purpose is a flexible chain or cable 19 which extends from an eye 20 on the inner face of the door 13 near its free edge, and a lug 21 provided on the underface of the plate 18 adjacent its free edge.

The length of this cable 19 is such that when the door is in open position, it pulls the plate 18 into the closed position across the opening 6 in the partition wall, and this limiting of the movement of the door by this chain or cable 19 also aids in supporting the door in the horizontal position. A suitable pulley or guide 22 may be provided at one side of the door opening in alignment with the chain or cable 19 so that when the door is opened, the chain 19 will move from the position shown by the dash lines in Fig. 2 to the position shown in full lines. An intermediate part of the chain or cable will engage and slide along the guide 22 disposed slightly above the level of the hinge 14, and this provides an upwardly acting support for the door 13. The partition wall 5 is provided with a suitable slot (not shown) through which the cable or chain 19 may slide as the door is opened and closed.

The heating unit has been shown only schematically or generally, because such heating units may be of any suitable construction, many different types of which are on the market, and any of them utilizing hot wires or elements may be employed. For example, the heater element may be a single spiral resistance element with spaces between adjacent turns, in which case the adjacent turns constitute the spaced stretches 9, or the stretches may be straight sections connected in series and extending back and forth between and connecting the sides of the frames 7, so as to form a grid-like structure.

Therefore any suitable heating element with spaces between adjacent stretches of the heater element, through which air may pass, may be employed. It will be noted that the heater elements will be in close proximity to the bottom of a cooking utensil resting upon the face 10 of the form 7, which facilitates maximum transfer of heat by radiation to the utensil, and in order that heat may not be lost any more than is necessary by downward radiation from the heat element, the upper face of the plate 18 is preferably a highly polished, metal reflecting surface which reflects upwardly, between the spaces and against the bottom of a cooking utensil resting on the heating unit, the major part of the heat that is radiated downwardly from the heater element. Thus maximum effectiveness of the heater unit is obtained, and the plate 18 with this reflective surface is advantageous, when the unit is utilized as a grill, even though movement of air upwardly through the heating unit is prevented by the bottom of a cooking utensil resting on the heater unit.

It will be observed that the plate 18 is preferably moved into and out of its position where it obstructs air flow, automatically by the movement of the door, so that the public using such a heater need be unconcerned about remembering to move the plate 18 into and out of its position shown in full lines in Fig. 2. It will be understood, of course, that if desired, the door may be omitted or left open so as to allow the heater air to escape through the opening 12 as the air outlet, when the device is used as a space heater as well as a grill; in which case, of course, the connection between the door and the plate 18 would not be employed and other means to move plate 18 would be provided, but preferably the air outlet is provided for by the openings 4 in the upper part of the housing, because this provides more of a chimney effect that aids the thermosiphon circulation of air when the device is used as a space heater, than would be possible if all or much of heated air escaped through the opening 12 at a lower level. The housing, including the partition wall 5 and the door 13, and also the plate 18 may be conveniently made of metal or any other material which is suitable and available.

In some instances it is desirable to forcibly circulate air through the heating unit, in order to increase the effectiveness of the heat transfer and produce a more pronounced circulation of air through the housing. For this purpose, and in such cases, a small electric motor 23 is mounted in the interior of the housing beneath the partition wall 5 and in front of the inclined baffle plate 18 when the latter is in its lower or open position. For example, the motor 23 may be mounted on a bracket strip 24 (Fig. 2) which is secured to the front wall of the housing, and suitable fan blades 25 are carried by the shaft of the motor in a position to direct a current of air upwardly along the upper face of plate 18 into the opening 6. The motor and the fan blades 25 are disposed outside of the path of movement of the free edge of the plate 18.

It is desirable that the fan motor 23 operate only when the plate 18 is in its downward position shown by dash lines in Fig. 2, and for this purpose a normally open switch 26 is mounted on the bottom wall of the housing in a position to be engaged and closed by the lug 21 of the plate 18 when the plate reaches its limit of downward movement, as shown in Fig. 2. The switch 26 is connected in series with the motor 23, and both are connected in parallel to the heater 9. The wiring diagram for this device is illustrated in Fig. 3 in which one terminal of the motor 23 is connected by a circuit wire 27 to the circuit wire 28 that connects one pole of the control switch 29 to one end of the heater element 9. The other circuit terminal of the motor 23 is connected by wire 30 to one side of the switch 26, the other side of that switch being connected by a wire 31 to the circuit wire 32 that connects the other pole of the main switch 29 to the other end of the heater element 9.

Thus whenever the switch 29 is closed to supply current to the heater element 9, current also will be supplied to the motor 23, but if the plate 18 is raised, such as when the device is to be used as a grill, so that the fan motor would be ineffective in circulating air through the housing, the switch 26 will be released and will open automatically, which interrupts the circuit to the motor and stops the fan, without interfering with the supply of current to the heater element 9. When the plate 18 descends to its lower position again it again engages and closes switch 26 so that the fan motor will operate simultaneously with the heater element.

It will be understood that various changes in the details, materials and arrangements of parts, which have been herein described and illustrated in order to explain the nature of the invention, may be made by those skilled in the art within the principle and scope of the invention, as expressed in the appended claims.

I claim:

1. An electric heater comprising a housing having an apertured partition wall intermediate of its top and bottom, an apertured frame carried by said partition wall, a heating unit with spaced stretches of an electric heater element disposed across the aperture of said frame, the space between said stretches being open for the passage of air therebetween, the portion of the partition wall surrounding said frame being substantially imperforate, said housing having an air inlet in the lower part below said partition wall, an air outlet in the upper part thereof above said partition wall, and in its side wall above said partition wall an opening of a size adequate to pass a cooking utensil and closed by a door movable between open and closed positions, a generally imperforate member disposed in said housing adjacent a face of said partition wall and mounted for movement into and out of a position in which it substantially obstructs movement of air upwardly between said stretches, whereby when said element is used as a grill, said member may be moved into its air obstructing position to limit dissipation of heat from said stretches by air circulating therebetween, and a connection between said member and door, whereby movement of said door into open position will automatically move said member into an air obstructing position and movement of said door into closed position will cause movement of said member into a position offering minimum obstruction to air flow through said partition wall.

2. An electric heater comprising a housing having a partition wall across the chamber thereof, intermediate the upper and lower ends thereof, an air inlet below said partition wall and an air outlet above said partition wall, said wall being generally imperforate but having a substantial aperture therethrough in its interior area, an electric heating unit having spaced stretches of a heater element disposed across the aperture in said partition wall, with open spaces between the stretches, whereby all air passing through said housing must pass through the spaces between said stretches, said housing having an opening above said partition wall and a door for that opening movable between open and closed positions, a member disposed in said housing immediately below said unit, and mounted for movement into and out of a position closing said aperture in said partition wall, whereby when said member is in said position in which it closes said opening, said heater unit may be utilized as an electric grill and a connection between said door and member by which opening of the door moves said member into said position across said aperture in said partition wall, and closing of the door causes movement of the member out of said position to allow air to pass through the aperture in said partition wall.

3. An electric heater comprising a housing having, intermediate of its top and bottom, a horizontal partition wall with an apertured zone in its interior, a frame carried by said partition wall across said apertured zone, and having a passage therethrough, a heater element having spaced stretches across said passage, with open spaces between stretches, said housing having an air inlet below said partition and an outlet above said partition, and also having above said partition wall an opening sufficiently large to pass a cooking utensil to the upper face of said frame, a door hinged to the body of the housing at approximately the lower edge of said opening and substantially closing said opening when swung into a position across it, and a prop hinged to the outer face of said door adjacent the upper edge of said door so as to hang flat against said door when the door is in closed position across said opening, and depend from the door, when the door is approximately horizontal, to form a prop limiting downward movement of the door, whereby the door may serve as a shelf in approximate alignment with the lower edge of said opening.

4. An electric heater comprising a housing having, intermediate of its top and bottom, a horizontal partition wall with an apertured zone in its interior, a frame carried by said partition wall across said apertured zone, and having a passage therethrough, a heater element having spaced stretches across said passage, with open spaces between stretches, said housing having an air inlet below said partition and an outlet above said partition, and also having above said partition wall an opening sufficiently large to pass a cooking utensil to the upper face of said frame, a door hinged to the body of the housing at approximately the lower edge of said opening and substantially closing said opening when swung into a position across it, a prop hinged to the outer face of said door adjacent the upper edge of said door so as to hang flat against said door when the door is in closed position across said opening, and depend from the door, when the door is approximately horizontal, to form a prop limiting downward movement of the door, whereby the door may serve as a shelf in approximate alignment with the lower edge of said opening, and a plate disposed in said housing beneath said partition wall, and movable into and out of a position across said apertured zone immediately below said spaced stretches to obstruct air flow upwardly through said apertured zone, whereby when said door is open and one desires to use the heater element as a grill, said plate may be moved into its position obstructing air flow upwardly between said stretches, but may be moved out of said position to pass air upwardly between said stretches when the heater element is used as a space heater.

5. An electric heater comprising a housing having, intermediate of its top and bottom, a horizontal partition wall with an apertured zone in its interior, a frame carried by said partition wall across said apertured zone, and having a passage therethrough, a heater element having spaced stretches across said passage, with open spaces between stretches, said housing having an air inlet below said partition and an outlet above said partition, and also having above said partition wall an opening sufficiently large to pass a cooking utensil to the upper face of said frame, a door hinged to the body of the housing at approximately the lower edge of said opening and substantially closing said opening when swung into a position across it, a prop hinged to the outer face of said door adjacent the upper edge of said door so as to hang flat against said door when the door is in closed position across said opening, and depend from the door, when the door is approximately horizontal, to form a prop limiting downward movement of the door, whereby the door may serve as a shelf in approximate alignment with the lower edge of said opening, a plate disposed in said housing beneath said partition wall, and movable into and out of a position across said apertured zone immediately below said spaced stretches to obstruct air flow upwardly through said apertured zone, whereby when said door is open and one desires to use the heater element as a grill, said plate may be moved into its position obstructing air flow upwardly between said stretches, but may be moved out of said position to pass air upwardly between said stretches when the heater element is used as a space heater, and a connection between said plate and door by which the door in opening moves said plate into said air flow obstructing position, and in closing causes movement of said plate out of said obstructing position.

6. An electric heater comprising a housing having, intermediate its upper and lower ends, a horizontal partition wall with an apertured zone in its interior, an electric heater unit disposed across said apertured zone at the upper face of said partition wall and having spaced stretches of a heater element, with openings between stretches for air passing upwardly through said apertured zone, said housing having an air inlet below said partition wall, an air outlet above said partition wall, an opening from approximately said partition wall upwardly and of a size to pass a cooking utensil into said housing above said partition, and a door hinged adjacent its lower edge to said housing approximately at the lower edge of the last mentioned opening to swing from a position across that opening to an approximately horizontal position, means for supporting said door in said horizontal position, a plate hinged to said partition at one side of said apertured zone for movement upwardly into a position in which it substantially closes said apertured zone, and a flexible cable connecting the upper part of said door to the free edge of said plate, and having a length which pulls said plate into closing position across the apertured zone when the door is in horizontal position, and which releases said plate for downward swinging movement as the door is swung upwardly into closed position, said partition wall having an aperture through which said cable passes.

7. An electric heater comprising a housing having, intermediate its upper and lower ends, a horizontal partition wall with an apertured zone in its interior, an electric heater unit disposed across said apertured zone at the upper face of said partition wall and having spaced stretches of a heater element, with openings between stretches for air passing upwardly through said apertured zone, said housing having an air inlet below said partition wall, an air outlet above said partition wall, an opening from approximately said partition wall upwardly and of a size to pass a cooking utensil into said housing above said partition, and a door hinged adjacent its lower edge to said housing approximately at the lower edge of the last mentioned opening to swing from a position across that opening to an approximately horizontal position, a plate hinged to said partition at one side of said apertured zone for movement upwardly into a position in which it substantially closes said apertured zone, a flexible cable connecting the upper part of said door to the free edge of said plate, and having a length which pulls said plate into closing position across the apertured zone when the door is in horizontal position, and which releases said plate for downward swinging movement as the door is swung upwardly into closed position, said partition wall having an aperture through which said cable passes, and a member hinged at its upper edge to the upper part of said door when the door is closed, so as to lie by gravity flat against said door and to swing by gravity into a vertical position depending from adjacent the free edge of said door when the door is swung downwardly into its horizontal position, so as to support said door in said horizontal position.

8. An electric heater comprising a housing having an apertured partition wall intermediate of its top and bottom, an apertured frame carried by said partition wall, a heating unit with spaced stretches of an electric heater element disposed across the aperture of said frame, the space between said stretches being open for the passage of air therebetween, the portion of the partition wall surrounding said frame being substantially imperforate, said housing having an air inlet in the lower part below said partition wall, an air outlet in the upper part thereof above said partition wall, and in its side wall above said partition wall an opening of a size adequate to pass a cooking utensil and closed by a door movable between open and closed positions, a generally imperforate member disposed in said housing adjacent a face of said partition wall and mounted for movement into and out of a position in which it substantially obstructs a movement of air upwardly between said stretches, whereby when said element is used as a grill, said member may be moved into its air obstructing position to limit dissipation of heat from said stretches by air circulating therebetween, an electric fan in said housing beneath said partition wall for directing air upwardly between said stretches, a switch in series with said motor, and connections actuated by said imperforate member when in position to open said aperture for placing said series connected switch and motor in parallel to the heater element.

9. An electric heater device comprising a housing having an air inlet in the lower part, an air outlet in the upper part, and a door in the side wall between said inlet and outlet and movable from a closed to an open position to provide direct access to the chamber of said housing, and an electric heating unit disposed in said chamber between said inlet and outlet and having spaced stretches of a heater element between which air may pass in a thermosiphon circulation through the housing, whereby when said door is closed, the device may function as a space heater, and when the door is open, direct access to said unit is provided and said unit may be also utilized as a grill, a member movable across the path of movement of air to said heater stretches, and a connection between said door and said member to move said member into position to interrupt said movement of air when said door is opened and into position to permit said movement when said door is closed.

10. An electric heater comprising a housing, a heater unit disposed in said housing, intermediate its top and bottom, and having spaced stretches of a heater element, with open spaces between stretches, means surrounding said unit for directing air upwardly through said spaces, said housing having openings above and below said unit, one of said openings above said unit having a size that will pass a common cooking utensil into and out of the housing to be supported in close proximity to said unit, a door for opening and closing said opening, a member in said housing movable into and out of a position immediately below said unit to interrupt the passage of air between said stretches, and means connecting said door and said member to move said member into position to permit the flow of air between said stretches when said door is closed and to move said member into position to interrupt the flow of air between said stretches when said door is open.

GERRIT VAN DAAM.

REFERENCES CITED

The following references are of record in the file of this patent:

UNITED STATES PATENTS

| Number | Name | Date |
| --- | --- | --- |
| 1,912,568 | Di Lorenzo | June 6, 1933 |
| 2,124,120 | Pogue | July 19, 1938 |
| 1,751,219 | Seamon | Mar. 18, 1930 |